United States Patent
Ultsch (12)

(10) Patent No.: US 6,221,500 B1
(45) Date of Patent: Apr. 24, 2001

(54) CROSSLINKABLE POLYMER COMPOUNDS FOR LEAD WIRE INSULATION, GASKETS AND LINERS IN A REFRIGERATION ENVIRONMENT

(75) Inventor: Stefan Ultsch, South Burlington, VT (US)

(73) Assignee: Champlain Cable Corporation, Colchester, VT (US)

( * ) Notice: Subject to any disclaimer, the term of this patent is extended or adjusted under 35 U.S.C. 154(b) by 0 days.

(21) Appl. No.: 09/373,253

(22) Filed: Aug. 12, 1999

(51) Int. Cl.[7] ............................. B32B 15/08; C08L 77/12
(52) U.S. Cl. ..................... 428/458; 525/92 A; 525/167
(58) Field of Search .................... 525/92 A, 167; 428/458

(56) References Cited

FOREIGN PATENT DOCUMENTS

97/30764 * 8/1997 (EP) .
60/152544 * 8/1985 (JP) .

* cited by examiner

Primary Examiner—Ana Woodward
(74) Attorney, Agent, or Firm—Salzman & Levy

(57) ABSTRACT

Insulation compounds are described that have been formulated for use in a refrigeration environment. The materials consist of crosslinkable compounds made from ionomer (EAS), polyether block amide (PEBA), polybutyleneterephthalate (PBT) homo- or copolymers, and/or polyvinylidenefluoride (PVDF). The insulation compounds are intended for use as wire insulation and in the fabrication of gaskets and liners. The compounds show superior resistance to refrigerants such as HCFC-22, HCFC-123, and HFC-134a. Crosslinking provides resistance to creeping under heat and pressure.

6 Claims, 1 Drawing Sheet

FIGURE 1

| | | SAMPLE | | | | | | | | | | | | | | | REF. | REF. 2 |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | PBT | DMD |
| | INGREDIENTS | | | | | | | | | | | | | | | | | |
| | IONOMER 1 | 100 | | 95 | 85 | 80 | 75 | 65 | | | | | | | | | | |
| | IONOMER 2 | | 100 | | | | | | 75 | 75 | 75 | | | | | | | |
| | PEBA 1 | | | | | | | | | | | 33 | 50 | | | | | |
| | PEBA 2 | | | 5 | | 5 | 15 | 15 | | | | | | | | | | |
| | PEBA 3 | | | | 15 | 15 | 10 | 20 | 25 | 25 | | 33 | 50 | | | | | |
| | PBT 1 | | | | | | | | | | | 33 | | 100 | 100 | | | |
| | PVDF | | | | | | | | | | 25 | | | | | 100 | | |
| 1 | TENSILE STRENGTH [psi] | 3012 | 3600 | 3100 | 4300 | 3500 | 4300 | 4500 | 4400 | 5800 | 4930 | 5300 | 9200 | 4590 | 4561 | 7200 | 5850 | |
| | TENSILE ELONGATION [%] | 300 | 300 | 220 | 310 | 210 | 300 | 310 | 300 | 280 | 380 | 260 | 250 | 217 | 225 | 10 | 450 | |
| 2 | DIELECTRIC STRENGTH [KV] | 26 | 28 | 30 | 33 | 34 | 30 | 30 | 32 | 27 | 27 | 26 | 25 | 28 | 12 | 20 | 19 | 4 |
| 3 | HCFC-22 | | | | | | | | | | | | | | | | | |
| | EXTRACTABLES [wt%] | 1.3 | 0.7 | 2 | 1.8 | 1.3 | 1.5 | 1.8 | 2 | 2 | 1.3 | 1.8 | 1.8 | 2.3 | 1 | 0.3 | 1.6 | 0.8 |
| 4 | HCFC-22 7d/140C | | | | | | | | | | | | | | | | | |
| | DIELECTRIC STRENGTH [KV] | 26 | 26 | 30 | 38 | 30 | 32 | 30 | 36 | 26 | 37 | 27 | 34 | 17 | 0 | crack | crack | 4 |
| | TENSILE ELONGATION [%] | 300 | 300 | 220 | 290 | 200 | 300 | 300 | 300 | 300 | 350 | 30 | 300 | 0 | fail | 0 | 0 | |
| | 1 D BEND [-] | pass | pass | pass | pass | pass | pass | pass | pass | pass | pass | pass | pass | pass | fail | fail | fail | |
| | SWELL/SHRINKAGE [%] | 0.0 | 0.0 | -1.8 | 0.6 | 1.2 | 0.5 | 0.0 | 0.0 | 0.0 | 0.0 | -2.0 | -2.0 | 2.4 | 1.0 | 6.0 | 2.0 | |
| 5 | HCFC-123 7d/140C | | | | | | | | | | | | | | | | | |
| | DIELECTRIC STRENGTH [KV] | 33 | 34 | | | | 25 | 33 | 16 | 26 | 26 | | | | | | crack | |
| | TENSILE ELONGATION [%] | | 220 | | | | 233 | 350 | 310 | 280 | 275 | | | | | | crack | |
| | 1 D BEND [-] | pass | pass | | | | pass | pass | pass | pass | pass | | | | | | fail | |
| | SWELL/SHRINKAGE [%] | 0.0 | 8.0 | | | | 3.0 | 3.0 | 6.0 | 4.0 | 3.0 | | | | | | na | |
| 6 | HFC-134a | | | | | | | | | | | | | | | | | |
| | DIELECTRIC STRENGTH [KV] | 33 | 33 | | | | | | | | | 28 | 26 | 20 | 14 | 25 | 12 | 4 |
| | 1 D BEND [-] | pass | pass | | | | | | | | | pass | pass | pass | pass | 3.30 | pass | |
| | SWELL/SHRINKAGE [%] | 0.0 | 0.0 | | | | | | | | | 0.2 | 0.0 | 1.2 | 0.0 | 3.3 | 0.7 | |
| 7 | HOT SET 240 C/0.1 MPa [%] | 52 | br* | 5 | 8 | 12 | 15 | 10 | 21 | 25 | 25 | 2 | 35 | br | melt | br* | melt | |
| 8 | VARNISH RESISTANCE [-] | pass | pass | pass | pass | pass | pass | pass | pass | pass | pass | pass | pass | pass | fail | pass | fail | |
| 9 | COLOR RETENTION [-] | dark | ok | ok | ok | ok | ok | ok | ok | ok | ok | ok | ok | ok | ok | ok | ok | |
| 10 | TS 7d/136C [psi] | 970 | 1000 | 3500 | 4400 | 3750 | 4300 | 4400 | 4350 | 4930 | 2600 | | | | | | 7400 | |
| | TE 7d/136C [%] | 60 | 60 | 260 | 290 | 220 | 300 | 300 | 300 | 310 | 80 | | | | | | 400 | |
| 11 | TS 7d/158C [psi] | 0 | 0 | 1350 | 2200 | 2250 | 4100 | 4200 | 0 | 0 | 0 | 25 | 25 | | | | 7400 | |
| | TE 7d/158C [%] | 0 | 0 | 90 | 90 | 80 | 180 | 290 | 0 | 0 | 0 | | | | | | 400 | |

CROSSLINKABLE POLYMER COMPOUNDS FOR LEAD WIRE INSULATION, GASKETS AND LINERS IN A REFRIGERATION ENVIRONMENT

FIELD OF THE INVENTION

The invention relates to melt extrudable, crosslinkable, polymer compounds for lead wire insulation, gaskets and liners in a refrigeration environment.

BACKGROUND OF THE INVENTION

The refrigeration environment is harsh for insulative materials, because of the reactive nature of refrigerant substances, humidity, and temperature extremes. Commonly used insulation for lead wiring in this environment consists of DMD, a wrapped polyester tape disposed between two braids of polyester fibers. This insulation is expensive to manufacture and difficult to apply. The braided fibers of this material tend to cause clogging problems in refrigerant circuits.

Another commonly used insulation material in the refrigeration environment is FEP, which is both expensive and stiff. This insulative substance also tends to present shrinkage/swell problems when exposed to harsher (higher temperature) hermetic requirements.

Still other materials comprise extrudable polyesters and blends of polyesters with up to 30 volume percent of other components, as illustrated in patent Document No. WO 96/34055. The main drawback of these extruded polyesters is their eventual loss of dielectric strength and physical properties, when exposed to refrigerants at elevated temperatures over longer periods of time. Eventually, these materials will crack. Other disadvantages of these materials are their high stiffness and comparative costs. In addition, these insulative substances cannot be crosslinked; they merely melt above their melting temperature. This may be critical for varnish application and baking processes in the manufacture of a refrigerant unit.

In patent Document No. WO 98/05046 an extrusion coating of PBT (polybutyleneterephthalate) with FEP is used to overcome the varnish bake problem.

Fluoropolymers, especially FEP are also in use for motor lead wire insulations. They are both expensive and stiff, and they display swell/shrinkage in certain refrigerants.

Fluoropolymers, especially fluoroelastomers, have been used as gaskets for harsh hermetic environments. These materials, however, are expensive. The fluoropolymers are not crosslinkable, and tend to creep under pressure.

Polyamides have also been used for gaskets, but tend to creep and tend to leach substances, when exposed to the refrigerants.

The new polymer materials of this invention have many advantages over the aforementioned prior art materials. The new compounds show superior property retention on exposure to currently used refrigerants (HCFC-22, HFC-134a). Their dielectric strengths remain unaffected, as do their mechanical characteristics. These materials show good color retention. Swelling and shrinkage of these materials, when used for motor lead wiring, is generally negligible. Swelling of two to five percent has been observed for motor lead wiring with respect to HCFC-123.

Retention of the dielectric constant and physical properties of the materials of this invention are vastly superior to those of prior art materials.

The amount of the leachable fractions of the inventive polymers (which tend to contaminate the refrigerant and eventually clog channels and valves of the refrigeration unit) can be adjusted to acceptable levels by crosslinking. The result is due to the low molecular weight fraction of the polymer, which becomes grafted to the crosslinked network, and due to antioxidants and stabilizers added to achieve sufficient heat age characteristics.

Compared to polyesters and FEP, the inventive compounds have greater flexibility. Due to their excellent retention of mechanical and electrical properties, wires can be produced with reduced insulation thickness, thus reducing cost and weight.

The crosslinked compounds of this invention do not creep under pressure or at elevated temperatures. This is relevant during varnish curing in a motor assembly or at the end application, where temperature peaks cause short circuits.

SUMMARY OF THE INVENTION

In accordance with the present invention, there are provided insulation compositions for lead wiring, gaskets and liners used in a refrigeration environment. The compositions consist of melt extrudable and crosslinkable polymers, which comprise 50 to 100 vol % (preferably 75 to 85 vol %) of ionomers (i.e., copolymers of ethylene and methacrylic acids). Preferably, these ionomers represent the matrix of the blend. The compositions also comprise 5 to 50 vol % (preferably 15 to 30 vol %) of polyether block amides.

Another composition of the invention comprises a) 60 to 95 vol % (preferably 75 to 85 vol %) of ionomers (i.e., copolymers of ethylene and methacrylic acids), and b) 5 to 40 vol % (preferably 15 to 30 vol %) of polybutyleneterephthalate.

A third composition comprises a) 50 to 90 vol % (preferably 50 to 80 vol %) of ionomers (i.e., copolymers of ethylene and methacrylic acids), b) 5 to 50 vol % (preferably 10 to 30 vol %) of polyether block polyamides, and c) 5 to 30 vol % (preferably 15 to 25 vol %) of polybutyleneterephthalate.

A fourth composition comprises a) 50 to 90 vol % (preferably 60 to 80 vol %) of ionomers (i.e., copolymers of ethylene and methacrylic acids), b) 0 to 25% (preferably 10 to 25%) of polyether block polyamides, and c) 10 to 30% (preferably 10 to 20%) of polyvinylidenefluoride.

These compositions can also comprise a) 0 to 5% of a crosslink agent, b) 0 to 5% of a stabilizer-antioxidant, c) 0 to 3% of compatibilizers, d) colorants, and e) flame retardants.

The insulations are preferably radiation crosslinked. To improve resistance against varnish coating, the wire may be coated with release agents.

It is an object of this invention to provide improved insulation compositions for lead wires in refrigeration environments.

It is another object of the invention to provide improved melt extrudable, crosslinked insulation compositions used in refrigeration motor lead wires.

It is another object of the invention to provide improved, melt extrudable and crosslinkable polymer compositions for use as gaskets and liners in refrigeration environments.

BRIEF DESCRIPTION OF THE DRAWINGS

A complete understanding of the present invention may be obtained by reference to the accompanying drawing, when considered in conjunction with the subsequent detailed description, in which:

FIG. 1 is a table of compounds in accordance with the present invention.

DESCRIPTION OF THE PREFERRED EMBODIMENT

Generally speaking, the invention features polymer compounds that have been formulated for use in a refrigeration environment. The materials consist of crosslinkable compounds made from ionomer (EAS), polyether block amide (PEBA), polybutyleneterephthalate (PBT) homo- or copolymers, and/or polyvinylidenefluoride (PVDF). The insulation compounds are intended for use as wire insulation and in the fabrication of gaskets and liners. The compounds show superior resistance to refrigerants such as HCF-22, HCFC-123, and HFC-134a. Crosslinking provides resistance to creeping under heat and pressure and reduces the fraction of extractables.

The compounds of this invention are illustrated in FIG. 1, which presents the properties of several samples of the fabricated compounds, samples 1 to 12. Samples 13 to 15 list raw data for PEBA, PBT and PVDF materials. To outline the superior properties of the new compounds, test data on PBT extrusion coated primaries as propagated for hermetic applications, and of DMD, are comparatively illustrated.

All formulations in FIG. 1 were compounded on a co-rotating twin screw extruder, with heat and process stabilizers, and a 2–3 phr TAIC (Triallylisocyanurate) crosslink promoter. Also, 0.2–3% stabilizers and antioxidants were added as required by the targeted temperature rating. The compounds were subsequently extruded into motor lead wires (12 and 16 AWG stranded conductor), having a 20 mil insulation thickness. Radiation crosslinking was performed with an E-beam unit, giving an average dose of 200 to 250 kGy. Such doses cause complete crosslinking, as illustrated by hot set measurements. In cases of clamp break, the materials did not melt, but did not have sufficient mechanical strength to withstand the test load.

Extraction tests were performed. Extractables were obtained in HCFC-22. The extractable fraction was measured with reference to NEMA MW 1000, but under testing conditions tailored to study 20 mil thick lead wire insulations. Following one to one, the NEMA test procedure tends to give only incomplete extraction, resulting in too few extractables.

The test procedure that was used comprised samples (1 g sample weight) that were pre-dried for one hour at 70 degrees C. A sixteen hour extraction was performed in a SOXHLET extractor. After extraction, samples were dried for a minimum of twenty-four hours at 70 degrees C., until a stable weight reading was achieved (i.e., until the refrigerant was completely evaporated from the sample). This procedure proved to be very accurate in quantifying extractables and in classifying materials. The goal was to stay below 1.5% extractables, the acceptable limit being 2.0%. Residuals, which represent the fraction actually dissolved in the refrigerant, tend to be significantly lower than extractables. Maximum limit is 2%. HCFC-22 is known to possess the highest solving power to extract low molecular fractions from polymers. Crosschecks with other refrigerants confirmed this finding.

Definitions:

Ionomer is a thermoplastic polymer that is ionically cross-linked and is obtainable, for example, from DuPont under the registered trademark, SURLYN. It comprises copolymers of ethylene and methacrylic acid. Carboxyl groups located along the polymer chain by copolymerization provide the anionic portion of the ionic cross-links. Metal ions, such as sodium, zinc and lithium, constitute the cationic part of the links.

Polybutyleneterephthalate (PBT) is also known as polytetramethylene terephthalate, PTMT, and can be purchased from Creanova, for example, under the registered trademark, VESTODUR.

Polyether block amides (PEBA) consist of a linear chain of rigid polyamide segments interspaced with flexible polyether segments. Tradenames are VESTAMID from Creanova or PEBAX from Atochem.

Poly(vinylidenefluoride) or PVDF can be purchased from Atochem, under the tradename of KYNAR.

Polyvinylfluoride or PVF can be purchased from DuPont.

Tetrafluorethylene/Hexafluoropropylene copolymer or FEP can be purchased from Hoechst and from DuPont.

Individual tests:

Test No. 1

Tensile strength and elongation: measured at 20 inch/min drawing speed. All compounds showed good mechanical properties.

Test No. 2

Dielectric strength is of the virgin materials.

Test No. 3

The extractable fraction in HCFC-22 was measured with reference to NEMA MW 1000, but under testing conditions tailored to study 20 mil thick lead wire insulations. Following one to one, the NEMA test procedure tends to give only incomplete extraction, yielding low extractable readings.

Test procedure used: samples (1 g sample weight) were pre-dried for one hour at 70 degrees C., to provide an adequate starting base. Sixteen hours of extraction were performed in a SOXHLET extractor. After extraction, samples were dried for a minimum of twenty-four hours at 70 degrees C., until a stable weight reading was achieved, indicating that the refrigerant was completely evaporated from the sample. This procedure proved to be very accurate in quantifying extractables and in classifying materials. The object was to stay below 2% or even 1.5% extractables. HCFC-22 was used because it is known to possess the highest solving power for extracting low molecular fractions from polymers.

Test Nos. 4 to 6

The samples were exposed for 7 days at 140 degrees C. to HCFC-22, HCFC-123 and HFC-134a. Twelve inch lengths of sample compositions were exposed in SOXHLET. After exposure, dielectric strength, break elongation, one diameter bending behavior, and swell/shrinkage of the insulations were determined.

Test No. 7

The samples were hot set tested to characterize crosslinking at 240 degrees C., 0.1 MPa, for 10 minutes. The temperature was clearly above the melting point of all ingredients investigated, but the crosslinking provided protection against melting.

Test No. 8

A varnish bake test was performed. Each of the new compounds showed excellent resistance against insulation cracking when their surface was treated with an adequate release agent.

Test No. 9

A color test was performed. The materials withstood elevated temperatures for several hours without discoloration.

Test Nos. 10 and 11

A heat aging test was also performed. Samples were exposed in a circulating air oven 7d/1 at 136 degrees C and 158 degrees C. as adequate. The compounds can be tailored via stabilization for satisfactory heat aging resistance.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A melt extrudable, crosslinkable polymer insulation composition for use in a refrigeration environment, comprising:

a) approximately 50 to 100 vol % of at least one ionomer, and b) approximately 0 to 50 vol % of polyether block amides consisting of linear chain rigid polyamide segments interspaced with flexible polyether segments, and wherein (a) and (b) are cross-linked to provide a polymer insulation that withstands a harsh refrigeration environment.

2. The polymer insulation composition in accordance with claim 1, wherein said at least one ionomer comprises 75 to 85 vol %.

3. The polymer insulation composition in accordance with claim 1, wherein said polyether block amides comprise 15 to 30 vol %.

4. The polymer insulation composition in accordance with claim 1, wherein said polyether block amides comprise 15 to 30 vol %.

5. The polymer composition in accordance with claim 1, wherein said polymer composition is radiation crosslinked.

6. Motor lead wires extrusion coated with the polymer composition in accordance with claim 1.

* * * * *